UNITED STATES PATENT OFFICE.

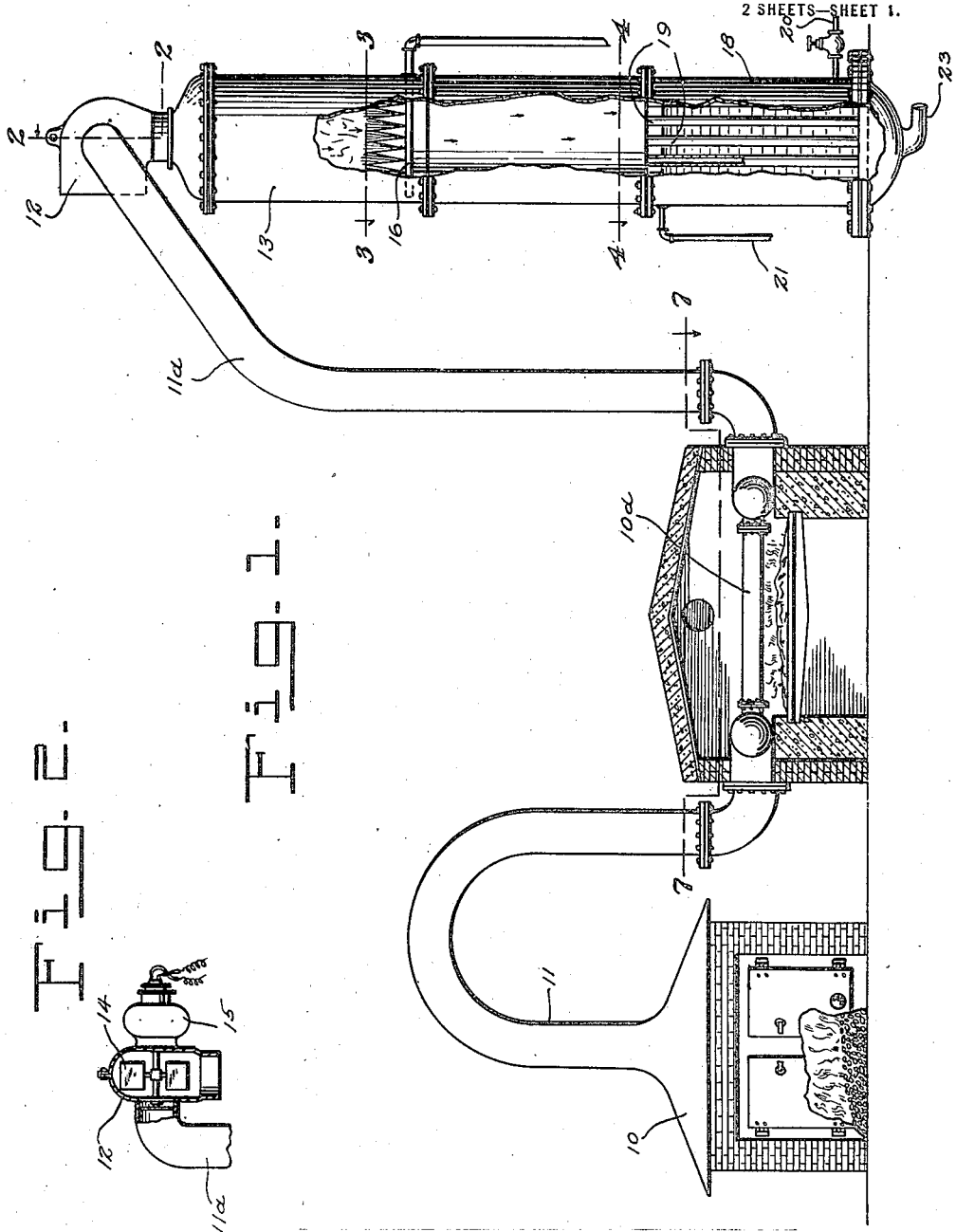

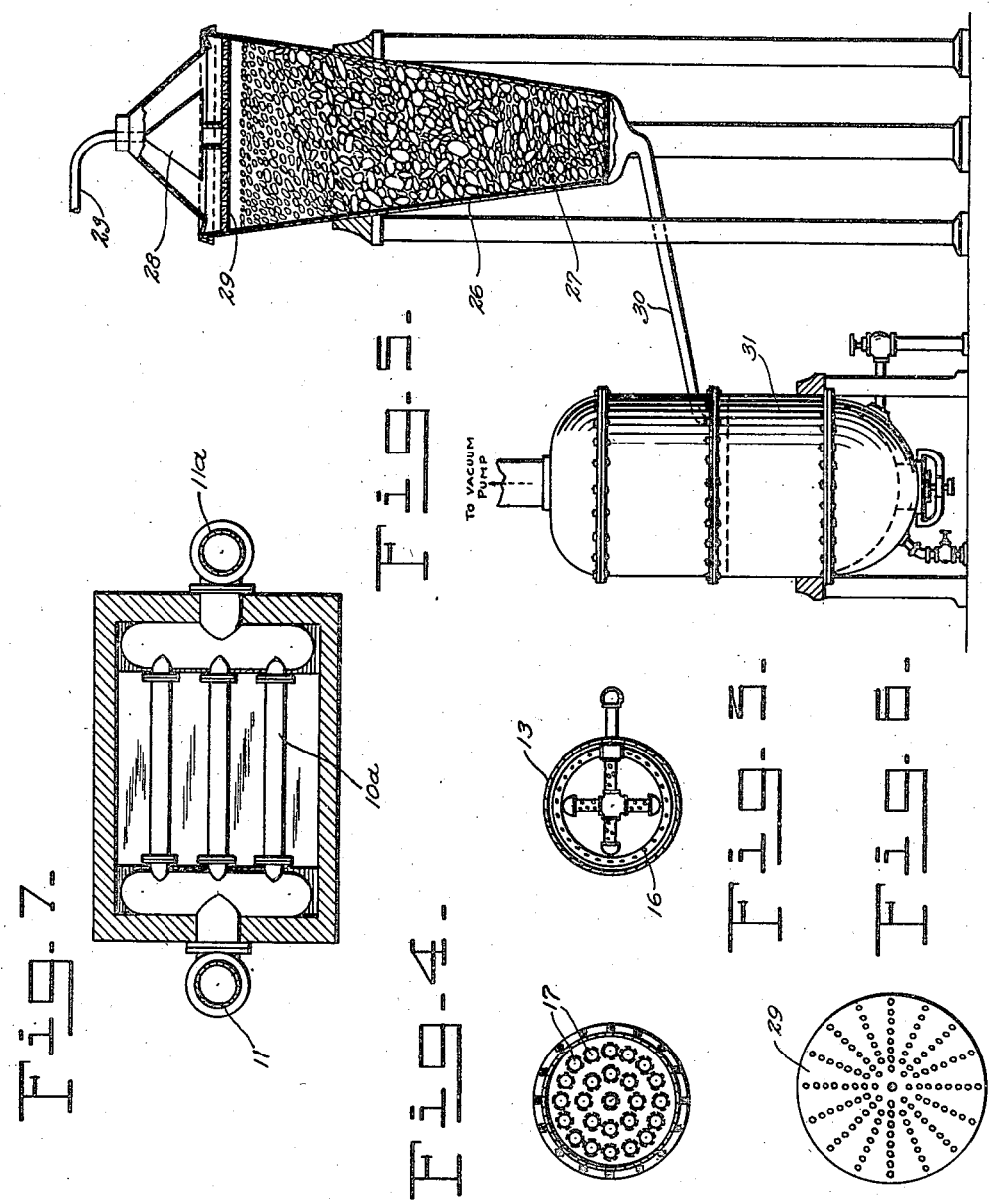

BENJAMIN HELLER, OF CHICAGO, ILLINOIS.

MEAT PRESERVATIVE AND METHOD OF MAKING THE SAME.

1,402,354.	Specification of Letters Patent.	Patented Jan. 3, 1922.

Application filed August 16, 1920. Serial No. 403,690.

*To all whom it may concern:*

Be it known that I, BENJAMIN HELLER, a citizen of the United States, residing at Chicago, in the county of Cook and State of Illinois, have invented new and useful Improvements in Meat Preservatives and Methods of Making the Same, of which the following is a specification.

This invention relates to an improved material for preserving, curing, coloring, and flavoring meats and reducing shrinkage in cured meat and sausage, and has for an object to provide a material the use of which results in improved curing of meat products and making of sausage.

It is discovered that the juices of meats carrying the hemoglobin are dissolved or extracted from meats by the application thereto of the usual curing agents, such as common salt, saltpetre (or potassium nitrate), or sodium nitrate. This apparently results from the fact that all meats are either neutral or alkaline in nature and that the curing of such meats by the use of neutral or alkaline salt, saltpetre or nitrate of soda continues the liquefying of the juices of the meat, which escape from the meats into the pickle when meat is cured in brine, or drain out of the meat when dry salted.

An object of the present improved invention is to bring about an acid condition of the curing compound when meat is dry salted, or an acid condition of the brine when meat is cured in brine, thereby coagulating the albumin in the juices of the meat, thickening or gelatinizing said juices, whereby they remain in the fibres of the meat instead of running out of the meat or into the brine, as occurs in the old way of curing. The retaining of the juices and the hemoglobin in the meat conserves the food values and the flavor of the meat, and at the same time conserves the red color imparted thereto by the hemoglobin, and also saves a large percentage of unnecessary shrinkage in size and weight.

Under federal statutes at present in force the only acid allowed in the preserving of meats is vinegar, acetic acid or the acid content of wood smoke. It is an object of the present invention to treat wood, preferably in the form of sawdust, with acetic acid or vinegar, ignite the wood so that the wood smoke therefrom shall contain not only the acids resident in wood, but the additional acid applied thereto (if found necessary), superheating the smoke to remove the carbon and other objectionable constituents, and saturate a neutral salt with the resultant, whereby such neutral salt contains the flavoring constituents of wood smoke, without excessive carbon coloring matter, and also the acids necessary for coagulating the albumin of the meat juices.

It has also been found that some woods contain sufficient acids in their composition so that acids need not be added before combustion. The acid content may also be added to the saline mass directly, either before or after the impregnation of such saline mass with the products of combustion of wood. The acid content may also be added direct to the meat in dry salting, or in the brine when meat is cured in the brine.

Wood smoke for curing meats, as heretofore produced by various methods in common use, is effective to but a very slight extent, owing to the very large proportion of the smoke being still in the solid form, and therefore, difficult of absorption or solution by steam, water, brine or a dry curing compound, and further, the full preservative, antiseptic, curing and flavoring value of wood smoke, is not developed at the temperature and in the manner commonly used for preparing wood smoke for use as a curing, flavoring and preserving agent. It has been found however, that by very considerably increasing the temperature of the wood smoke, before it comes in contact with the absorbing agent, be the latter steam, water, brine, salt or a curing compound, its value and strength as a preserving, antiseptic, curing and flavoring agent are thereby greatly enhanced.

The process hereinbefore referred to, including the step of superheating the smoke for the purpose stated, may be carried out by any suitable apparatus forming no part of the present invention. However, in order that the invention may be better understood, an apparatus is illustrated in the accompanying drawings forming a part of this specification.

In the drawings,

Figure 1, a view in side elevation of a combustion chamber, smoke superheater and scrubbing tower, parts being broken away to show the internal construction;

Fig. 2 is a view, partly in side elevation and partly in section, of the blower fan used for inducing a draft from the superheater and forcing it into the scrubbing tower;

Fig. 3 is a top plan view of the steam coil.

Fig. 4 is a top plan view of the condensing and cooling tubular member;

Fig. 5 is a view, partly in side elevation and partly in section, of the percolator and vacuum pan;

Fig. 6 is a top plan view of the perforated diaphragm of the percolator, employed to produce a substantially even distribution of the fluid passing into the percolator, and Fig. 7 is a section on the line 7—7 of Fig. 1.

Like characters of reference indicate corresponding parts throughout the several views.

The improved process which forms the subject matter of this application is disclosed in the drawings as being carried out by the use of a smoke generator comprising a combustion chamber 10, in which the wood containing the requisite amount of acid, either naturally or applied thereto, is burned, producing smoke which passes from the generator 10, through a pipe 11, to a superheater 10$^a$, in which the smoke is heated to a high temperature. The superheater may be a bank of tubes of iron or other suitable material embedded in a hot coke fire. This heat treatment of the smoke causes practically all its constituents to be converted into a vapor, and therefore readily soluble, and consequently capable of complete absorption by steam, water, brine or a curing compound. The composition of the vaporized smoke also becomes very much strengthened in its component parts possessing preservative, antiseptic, curing and flavoring qualities. The smoke is therefore more active, and of greatly enhanced value for the purpose ordinary wood smoke is employed. The heat treatment also eliminates all carbon and other objectionable elements from the smoke. The temperature at which the smoke is produced in the generator 10 by a smoldering fire is quite low as compared to the temperature to which it is raised in the superheater 10$^a$, and the heat treatment practically amounts to a re-distillation of the smoke. This not only consumes the free carbon in the smoke, and largely increases the valuable constituents of the smoke (acetic acid, phenols, cresols, guaicol, etc.), but it also splits up many of the complex, but low boiling constituents of the tarry matters, thereby largely increasing the percentage of these preservative and flavoring constituents.

From the superheater 10$^a$, the superheated smoke passes through a pipe 11$^a$ into a hood 12 which is mounted upon the top of a scrubbing tower 13 and contains a blower or fan 14 operated by any suitable means, such as a motor 15.

The scrubbing tower contains a steam jet or ring 16, having its perforations opening upwardly so that the superheated products of combustion from the pipe 11$^a$ forced downwardly by the fan 14, meet the upwardly ascending steam from the ring 16 and commingle therewith. The steam, together with the super-heated products of combustion, or the steam carrying such products of combustion uncondensed, are forced downwardly through the openings 17 in the cooling member 18. The cooling member 18 is of tubular construction, as indicated at 19 and is water jacketed, the water entering through the pipe 20 and discharging through the pipe 21. The combined vapors of smoke and steam are condensed in this cooling chamber and are discharged through the pipe 23 into the percolator 26. The percolator 26 contains a saline mass 27, as, for instance, sodium chloride, sodium nitrate or potassium nitrate, or any or all of these salts commingled. The percolator is also preferably provided with a cone distributer 28, located above the perforated diaphragm 29, by the use of which, separately or combined, a reasonably uniform distribution of the fluid passing from the pipe 25 is accomplished.

From the percolator 26 the liquor saturated with dissolved salts is discharged through the pipe 30 into the vacuum pan 31, wherein the liquid carriage is evaporated, leaving the crystalline mass impregnated with the smoke and acidified. This acidulated saline mass is preferably broken up or ground to such physical condition as may be found most convenient for use, and is employed by being dissolved in water to form a brine, in which the meat to be preserved is placed and retained therein until the desired curative stage has resulted, or it is sprinkled all over the meat dry, and the meat its cured in this dry form.

It is obvious that either the sodium chloride, sodium nitrate or potassium nitrate—or even sugar, under some conditions—may be impregnated separately with superheated smoke so that, in the use of these materials for producing a brine or for dry salting, the user may combine with such salts (or sugar) in any proportion required or desired, each of said ingredients containing the superheated products of combustion or acid; or it is obvious that one or more of said impregnated salts (or sugar) may be employed in combination with untreated salts or sugar, if it is for any reason found desirable to decrease the amount of acidulation or flavoring from the wood smoke or the acid.

It is also obvious that the practice of the process may be discontinued prior to the introduction of the fluid into the percolator, whereby the fluid carrying the smoke and the acid content is produced, and which may be used by being mixed with the meat or placed into the brine; or it may be used as the solvent for the several salts (or sugar) and the solvent applied to the meat or brine without first impregnating the salts (or sugar), and without evaporating the water carried from the smoke. When the process is being carried out in an establishment fitted for the purpose, it is obvious that these latter means of carrying out the process might be found economical, eliminating as it does, the evaporation of the water from the impregnated saline mass, only to be added again when the meat is to be treated. When, however, the material is to be put upon the market as a meat curing compound, for use where an apparatus for saturating water with the products of wood combustion is not located, the marketing in powdered or granular form would be found desirable and more convenient than marketing it in liquid form.

It is obvious that the present invention includes broadly the bringing together during the process of dry curing meat, or in the curing brine, the superheated products of wood combustion properly acidulated and the saline preservatives, whether such bringing together be accomplished by combining in the meat preserving vat or in the brine or in the box or barrel, when dry curing by the use of impregnated salts, or whether the salts impregnated be dissolved in water or brine, or whether all of the salts employed are impregnated or only some are impregnated.

It is obvious also that the saturated water or brine may be employed as a preservative solution and impregnated salts (or sugar) added thereto to increase, when found desirable, the acid content of the preservative solution, or to augment the flavoring of the wood distillate.

It will be evident that the present invention is capable of a very wide range of proportion of acid and wood distillates relative to the salts employed, and such range of proportion will be employed as the experience of the packer or sausage maker finds desirable for the particular purpose for which it is used, or the particular meat being preserved or cured, or other conditions surrounding the curing and handling of the meat.

It is also obvious that where it is necessary to add an acid constituent, such acid constituent may be added by being introduced directly into the percolator, or by being introduced directly into the vacuum pan, or, where found desirable, may be introduced into the curing brine or mixed with the meat when dry salted, under conditions where the ignited wood mass, acidified or otherwise, is not being found to produce sufficient acidulation for the proper coagulation of the meat juices.

I claim:

1. The method of producing a meat preservative, consisting in commingling an aqueous vapor and the superheated products of wood combustion, employing the resultant as a solvent for a saline preservative, and driving off the aqueous carriage, leaving the saline mass impregnated with the products of the wood combustion.

2. The method of producing a meat preservative, consisting in commingling an aqueous vapor and the superheated products of wood combustion, condensing the commingled vapors, employing the resultant liquid as a solvent for a saline preservative, and driving off the aqueous carriage, leaving the saline mass impregnated with the products of wood combustion.

3. The method of producing a meat preservative, consisting in dissolving a saline preservative in a liquid wholly or partially saturated with the superheated products of wood combustion, and driving off the water, leaving the superheated products of wood combustion impregnating the saline mass.

4. The method of producing a meat preservative, consisting in impregnating a saline preservative with the superheated products of wood combustion.

5. The method of producing a meat preservative, consisting in impregnating a saline preservative with the superheated products of wood combustion and an acidifying agent.

6. The method of producing a meat preservative, consisting in igniting wood, superheating the products of combustion, conducting the superheated products of the wood combustion into a receptacle containing an aqueous vapor, and commingling the superheated products of wood combustion with such aqueous vapor, conducting the commingling vapors through a condenser, conducting the condensed fluid through a percolator containing a saline preservative, conducting the salt-saturated fluid through an evaporator, and in the evaporator driving off the water, leaving the salty mass impregnated with the superheated products of wood combustion.

7. The method of producing a meat preservative, consisting in igniting wood, superheating the products of combustion, conducting the superheated products of combustion through a container, and commingling with an aqueous vapor, condensing the commingled vapors, removing from the condensed liquid the free carbon, applying the resultant liquor to a saline mass as a solvent, and driving off the water from the salt-impregnated liquid.

8. The method of producing a meat preservative, consisting in igniting wood, superheating the products of combustion, conducting the superheated products of combustion through a container to commingle with an aqueous vapor, condensing the commingled vapors, conducting the condensed liquid to a percolator containing a saline preservative to dissolve such saline mass, conducting the saline-saturated liquid to an evaporator, and driving off the aqueous content.

9. A composition of matter consisting of a meat preserving agent impregnated with the superheated products of wood combustion.

10. The method of producing a meat preservative consisting in impregnating a preserving agent with the superheated products of wood combustion.

11. The method of producing a meat preservative consisting in igniting wood, superheating the products of combustion, and commingling such superheated products of combustion with a fluid carriage.

12. The method of producing a meat preservative consisting in igniting wood, superheating the products of combustion, commingling the superheated products of combustion with steam and condensing the resultant vapors.

In testimony whereof I affix my signature.

BENJAMIN HELLER.